(12) United States Patent
Schmoyer

(10) Patent No.: US 6,758,910 B2
(45) Date of Patent: Jul. 6, 2004

(54) APPARATUS AND METHOD FOR SULFONATING AN ARTICLE AND ARTICLES MADE THEREFROM

(76) Inventor: Thomas E. Schmoyer, 2458 Thistle Pointe, Bloomfield Hills, MI (US) 48304

(*) Notice: Subject to any disclaimer, the term of this patent is extended or adjusted under 35 U.S.C. 154(b) by 208 days.

(21) Appl. No.: 10/008,431

(22) Filed: Nov. 13, 2001

(65) Prior Publication Data

US 2003/0091741 A1 May 15, 2003

(51) Int. Cl.[7] ............................................. C23C 16/00
(52) U.S. Cl. ................................... 118/715; 118/726
(58) Field of Search .................................. 118/715, 726

(56) References Cited

U.S. PATENT DOCUMENTS

| | | | |
|---|---|---|---|
| 2,832,697 A | 4/1958 | Walles | 117/69 |
| 3,613,957 A | 10/1971 | Walles | 220/64 |
| 3,684,554 A | 8/1972 | Donald et al. | 117/47 A |
| 3,685,446 A | 8/1972 | Walles et al. | 101/453 |
| 3,689,810 A | 9/1972 | Walles | 317/258 |
| 3,705,041 A | 12/1972 | Walles et al. | 99/171 |
| 3,725,109 A | 4/1973 | Schulz et al. | 117/47 |
| 3,740,258 A | 6/1973 | Walles | 117/94 |
| 3,770,706 A | 11/1973 | Walles | 260/79.3 R |
| 3,779,840 A | 12/1973 | Walles | 156/3 |
| 3,824,762 A | 7/1974 | Walles | 53/88 |
| 3,828,960 A | 8/1974 | Walles | 215/13 R |
| 3,856,172 A | 12/1974 | Walles | 215/364 |
| 3,911,184 A | 10/1975 | Caskey et al. | 428/35 |
| 3,916,048 A | 10/1975 | Walles | 428/35 |
| 3,921,844 A | 11/1975 | Walles | 215/35 R |
| 3,947,539 A | 3/1976 | Lane | 264/320 |
| 3,959,561 A | 5/1976 | Walles | 428/412 |
| 3,993,811 A | 11/1976 | Walles | 428/35 |
| 3,996,725 A | 12/1976 | Walles | 53/94 |
| 4,105,841 A | 8/1978 | Settineri et al. | 526/62 |
| 4,220,739 A | 9/1980 | Walles | 525/344 |
| 4,457,977 A | 7/1984 | Walles | 428/463 |
| 4,518,681 A | 5/1985 | Johnson et al. | 430/532 |
| 4,615,914 A | 10/1986 | Walles | 427/237 |
| 4,745,015 A | 5/1988 | Cheng et al. | 428/35 |
| 4,759,814 A | 7/1988 | Katz | 156/198 |
| 4,775,587 A | 10/1988 | Walles | 428/305 |
| 4,861,250 A | 8/1989 | Walles et al. | 425/90 |
| 4,902,493 A | 2/1990 | Walles et al. | 423/522 |
| 4,915,912 A | 4/1990 | Walles et al. | 422/160 |
| 5,030,399 A | 7/1991 | Walles et al. | 264/83 |
| 5,229,077 A * | 7/1993 | Bell et al. | 422/168 |
| 5,233,081 A | 8/1993 | Walles | 562/75 |
| 5,261,764 A | 11/1993 | Walles | 405/52 |
| 5,308,587 A * | 5/1994 | Cameron | 422/160 |
| 5,374,314 A * | 12/1994 | Babacz | 118/723 MP |
| 5,565,248 A * | 10/1996 | Plester et al. | 427/571 |
| 5,677,010 A * | 10/1997 | Esser et al. | 427/489 |
| 5,679,412 A * | 10/1997 | Kuehnle et al. | 427/534 |
| 5,849,818 A * | 12/1998 | Walles et al. | 524/8 |
| 6,276,296 B1 * | 8/2001 | Plester | 118/723 R |
| 6,572,835 B1 * | 6/2003 | MacArthur et al. | 423/532 |
| 2003/0091741 A1 * | 5/2003 | Schmoyer | 427/255.28 |

* cited by examiner

*Primary Examiner*—Jeffrie R. Lund

(57) ABSTRACT

Apparatuses, methods and articles made therefrom include the use of an on-site and on-demand gas generator for preparation of sulfonating gas to be mixed with dry air to treat surfaces of polymeric materials. The apparatuses and methods may be utilized by placing numerous articles into a container and sulfonating all of the articles at once in a batch process, or there may be a multiple injection port gas delivery system for the production of numerous articles of enclosed vessels with the sulfonation treatment on the interior surface of the vessel.

14 Claims, 3 Drawing Sheets

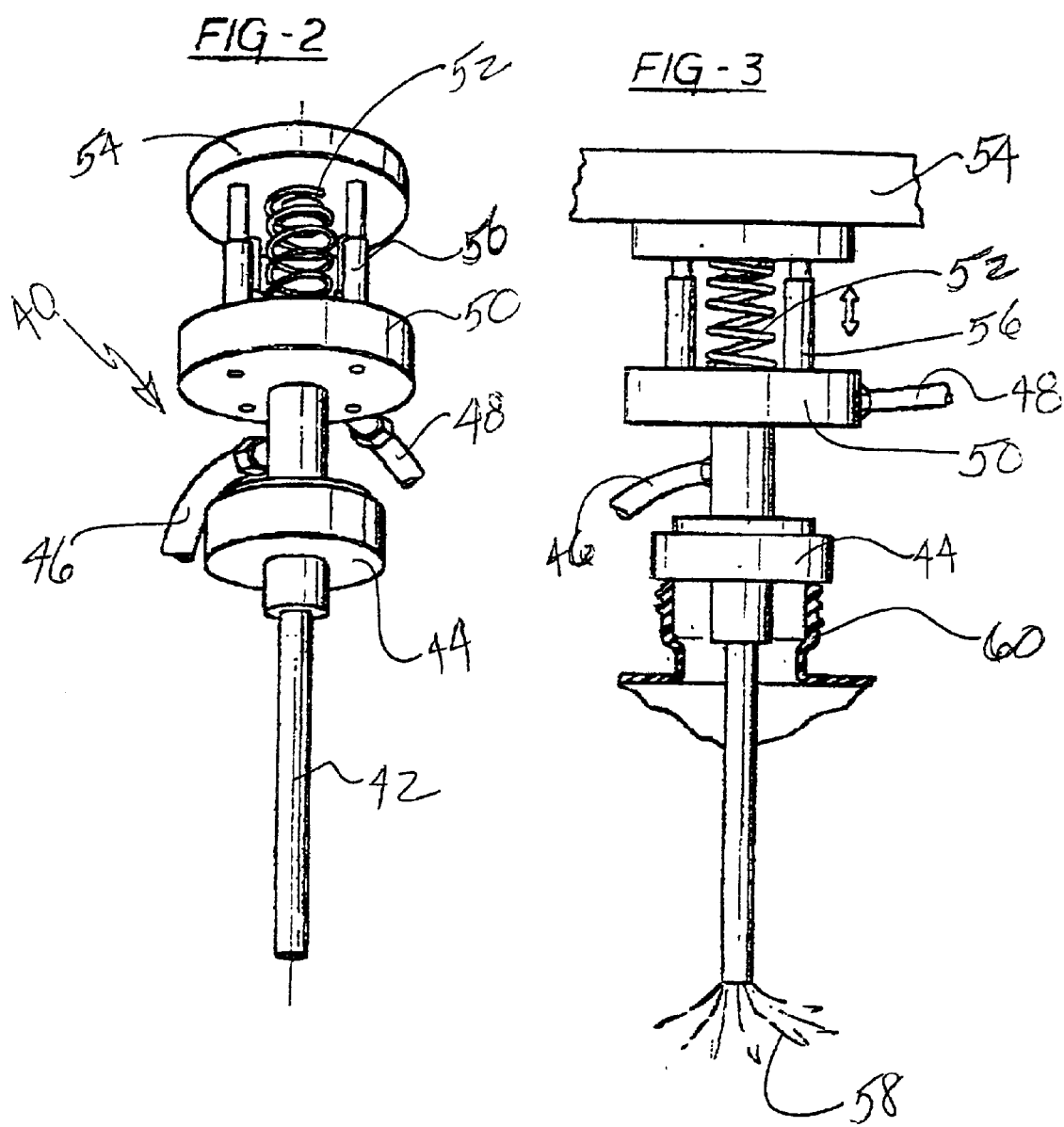

APPARATUS AND METHOD FOR SULFONATING AN ARTICLE AND ARTICLES MADE THEREFROM

TECHNICAL FIELD

This invention relates generally to forming a barrier layer on the surface of an enclosed vessel in order to render it impermeable to hydrocarbon liquids and gases, and more particularly to an apparatus and method for sulfonating an article and the articles made thereby.

BACKGROUND OF THE INVENTION

As everyone knows, air pollution is a problem for our society, and controls have been placed on the acceptable levels of various emissions allowable by law. Automobiles and their various components are especially susceptible to controls for gaseous emissions into the air. Air pollution is not only measured by the amount of emissions coming out of the tailpipe of a vehicle during operation, but also the amount of pollution it creates just sitting there. After the vehicle is turned off, hydrocarbon fumes permeate through the plastic gas tank and escape into the atmosphere, thereby creating more air pollution, even though it is not pollution which comes from the tailpipe. It has been found that measurable amounts of gasoline permeate through the plastic gas tanks and evaporate into the air, causing further air pollution. In addition to gasoline tanks, the complementary caps, filler necks, and rollover valves are generally made from blow molded plastic compounds, also found to readily be permeated by oleophilic materials, including gasoline and other liquid hydrocarbons. Similar concerns arise for bottles and containers for hydrocarbon solvents, or any other liquid hydrocarbon container or component. In the recent past, various attempts have been made to prevent that permeation, including the use of barrier layers, multi-layer configurations and surface treatments.

One such prior art attempt included the use of a sulfur-containing gas to contact the inner surface of a gasoline tank, thereby creating a sulfonation barrier layer to prevent permeation of gasoline. Generally speaking, these gasoline tanks are made of a sulfonatable polymer, i.e. one which has hydrogen atoms bonded to the carbon atoms replaceable by sulfonic acid groups. For example, polypropylene, polyethylene, polybutylene, and other plastics are sulfonatable, while polytetrafluoroethylene would not be sulfonatable.

These surface sulfonatable polymers have previously been sulfonated with sulfur trioxide gas. This conventional method is relatively slow and very expensive, and gave an undesirable rinseable salt on the inside of the tank. The prior art methods for sulfonating included placing the entire gasoline vessel and/or its complementary components into a chamber, evacuating the chamber of air and re-introducing sulfur trioxide gas. Needless to say, this method is slow and uses a great deal of sulfur trioxide gas, which in itself is a significant problem for the environment.

Other methods for creating a barrier layer on gasoline tanks, as well as other vessels for containing hydrocarbon liquid materials, such as various solvents, including toluene, benzene and the like, have included the use of blow molding multiple layers of plastic, including various components which act as barrier layers. Until recently, the standard for barrier layers included a multi-layer plastic embodiment which was practiced by suppliers to the automotive industry. The multiple layers were formed during the blow molding stages and these procedures are relatively fast and easy to manufacture utilizing conventional methods. However, the permeability to gasoline is not acceptable for new EPA standards, and the sulfonating technique has been revisited, even though it previously had problems with speed and ease of application.

Therefore, it is an object of the present invention to provide an apparatus for rapidly, inexpensively and efficiently sulfonating the surface of an article with a sulfonating gas to modify and treat the surface in order to provide a hydrocarbon impermeable material to be used as a storage means for such liquids and/or gases. It would be especially advantageous to utilize an inexpensive source of sulfur, and recycle and reuse the sulfur trioxide gas such that essentially none of it is released into the atmosphere.

It is yet another object of the present invention to provide such an apparatus which can quickly and inexpensively apply the sulfonating technique to the surface of a storage vessel.

It is yet another object of the present invention to provide an apparatus for sulfonating the surface of polymeric articles, including a multi-port gas delivery system with individual ports for "filling" a multitude of vessels for sulfonating simultaneously.

It is still yet another object of the present invention to provide a method for sulfonating an article to effect a surface treatment which quickly and inexpensively provides a sulfur-containing gas to effect the sulfonation, as well as the articles made therefrom.

It is yet a further object of the present invention to provide a method for sulfonating a hydrocarbon-containing vessel which will comply with the EPA and the various regulations for many states regarding the storage and transport of toxic and hazardous materials in these vessels.

SUMMARY OF THE INVENTION

In accordance with the preferred embodiments of the invention, these and other objects of the invention are addressed as follows. An apparatus for sulfonating the surface of an article with a sulfonating gas to modify and treat the article is disclosed which includes an enclosable container which is substantially airtight to contain substantially all of the sulfonating gas, a gas inlet for introducing the gas into the container, and an on-site and on-demand sulfur-containing gas generator utilizing a chemical feed stock selected from the group consisting of raw sulfur, processed sulfur, sulfur dioxide, liquid sulfur dioxide, sulfur trioxide, sulfuric acid and mixtures thereof, to produce the sulfur-containing gas on site at a predetermined concentration. The disclosed apparatus also includes a source of dry air for mixing with the sulfur-containing gas and a pump for pumping the gas into the enclosable container. The apparatus may further include an in-line heater to heat the dry air, as well as a sensor for monitoring the concentration of sulfur in the sulfur-containing gas after it has been exhausted from the container after the sulfonation process has been complete. By monitoring the sulfur concentration with the sensor, the monitor may be adapted to trigger the on-site gas generator to make more sulfur-containing gas, thereby maintaining the optimum concentration of sulfur in the gas which is introduced into the next batch in the enclosable container holding the articles to be sulfonated.

In another embodiment of the present invention, another apparatus is disclosed for sulfonating an enclosed vessel, such as an automobile gasoline tank, with sulfonating gas to modify and effect a treatment on the interior surface of the vessel. This apparatus includes at least one inlet to be inserted into the opening of the enclosed vessel for injecting sulfonating gas into the vessel in a substantially airtight seal. Preferably, this apparatus may include a multi-port delivery system so that a multitude of enclosed vessels, such as a gasoline tank, can be sulfonated at one time. Again, there is present the on-site and on-demand sulfur-containing sulfonating gas generator as described above, with a source of dry air for mixing with the sulfur-containing gas. A pump included in the apparatus pumps the sulfonating gas through the injection inlets, whereby the interior surface of the gasoline tank or other enclosed vessel is sulfonated. An optional sulfur concentration sensor or monitor can be used to maintain the sulfur levels in each new application.

These two above embodiments disclose the apparatuses usable for both automotive gasoline tanks and for the smaller components that are required for assembly within an automobile, including, but not limited to, gas caps, filler necks, rollover valves and the like. Needless to say, the enclosable vessels can be sulfonated by injecting gas into the vessel, while the other accessories can be sulfonated by placing them into an enclosed container and subjecting them to a sulfonation gas. Both systems are substantially airtight, so that when a sulfonating gas is injected either into the enclosed container or directly into the enclosed vessel itself, the exhaust gas can be monitored for its sulfur concentration, and a sulfur concentration makeup system can be activated with the on-site and on-demand sulfonating gas generator. These apparatuses essentially utilize all of the sulfur-containing gas without release into the atmosphere, as the release of sulfonating gas would be an environmental tragedy.

In order to automate this operation, another embodiment of the present invention is disclosed which includes an apparatus for applying a treatment or surface modification onto the surface of polymeric articles including the multi-port gas delivery system described above, with means for containing and transporting the sulfonating gas and recycling and delivering to a continuous supply of polymeric articles to be sulfonated. Further, this apparatus, along with the ones described above, may also include a means for introducing a neutralizing agent to neutralize the surface of the sulfonated polymeric articles after they have been sulfonated.

In another embodiment of the present invention, yet another object of the present invention is accomplished with the following methods. Disclosed is at least one method for sulfonating an article to effect a surface treatment, including the steps of placing at least one article in an enclosable container, the container being capable of being substantially airtight. Sulfonating gas is generated on-site and pumped into either the enclosable container with parts or articles therein, or directly into the interior of an enclosable vessel, such as a gas tank. After the sulfonation treatment is accomplished, the gas is exhausted, ready to be rejuvenated and recycled, and the sulfonated surface may be neutralized by contacting with a neutralizing agent, such as a positive ion-containing fluid. After the neutralizing agent is removed, the article is ready to be put into service.

Therefore, new apparatuses and methods for sulfonating an article and articles made therefrom are disclosed which meet the objects and advantages of the present invention.

BRIEF DESCRIPTION OF THE DRAWINGS

The nature and extent of the present invention will be clear from the following detailed description of the particular embodiments thereof, taken in conjunction with the appendant drawings, in which:

FIG. 2 is a perspective view of an injection inlet made in accordance with one of the preferred embodiments of the present invention, illustrating the injection port and the exhaust port;

FIG. 3 illustrates the injection inlet in place within the neck of an enclosed vessel, and injecting gas therein;

DETAILED DESCRIPTION OF THE INVENTION

Figure 1:
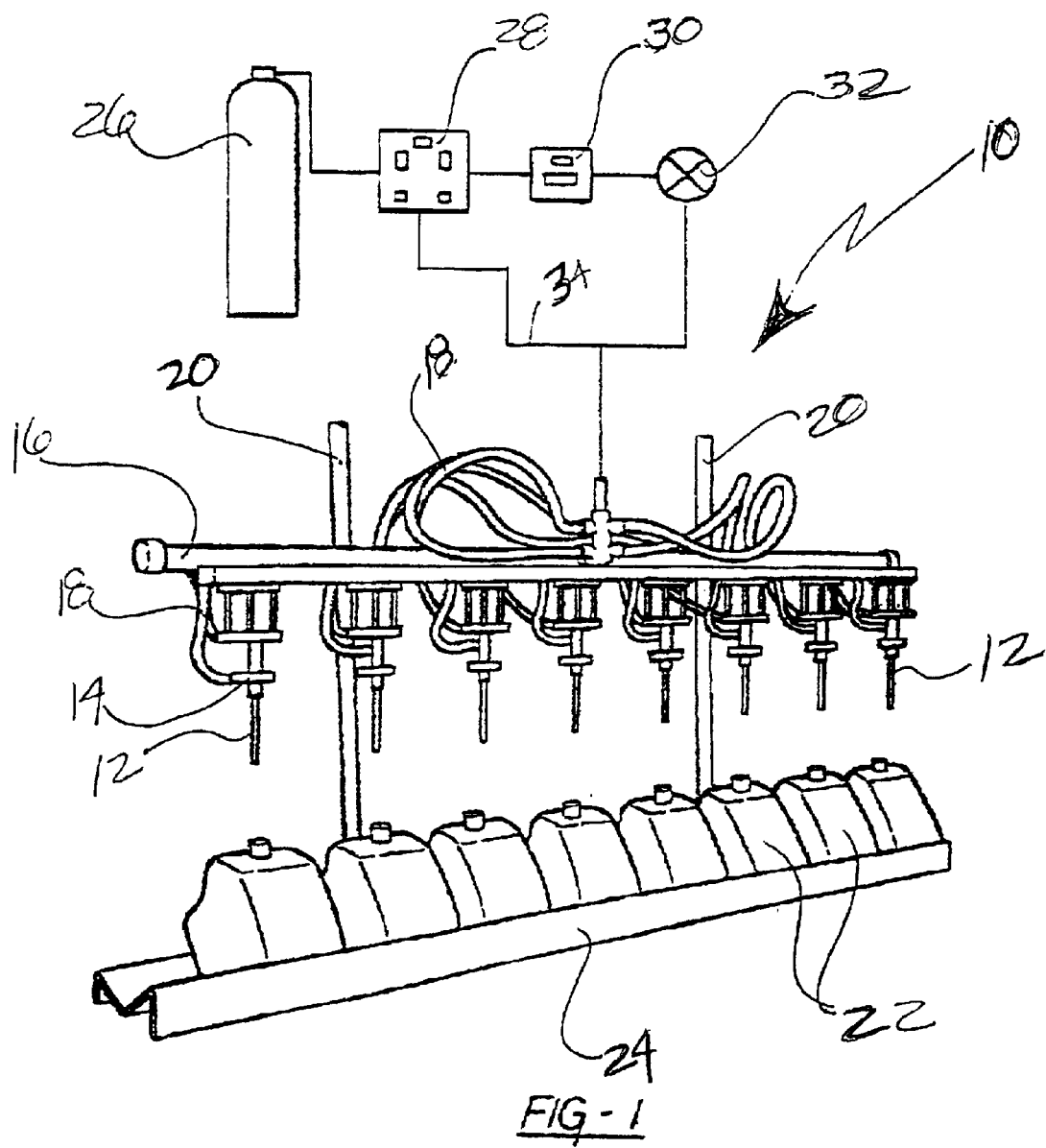
FIG. 1 shows a multi-port sulfonating apparatus for sulfonating gasoline containers constructed in accordance with one embodiment of the present invention.

In practicing the invention, there are basically six (6) aspects to the present invention. They are as follows: I) Multi-Port Sulfonation Apparatus To Treat Multiple Articles; II) Sulfonation Apparatus To Treat An Interior Surface Of A Vessel; III) Sulfonation Apparatus To Treat Articles Within An Enclosable Container; IV) Method Of Sulfonating An Article In An Enclosable Container; V) Method Of Sulfonating An Interior Surface Of A Vessel; and VI) Sulfonated Articles Made By The Above Methods. There are certain things in common for all six of these aspects, mainly the provision of an on-site and on-demand sulfur-containing gas generator in communication with the article or vessel to be sulfonated. We will discuss here the common parts of these six aspects, and then will follow with individual discussions of the individual preferred embodiments and aspects.

The on-site sulfur-containing gas generator may be any suitable generator of sulfur-containing gas, including, but not limited to, sulfur trioxide generators using a chemical feed stock selected from the group consisting of raw or liquid sulfur, processed sulfur, sulfur dioxide, liquid sulfur dioxide, sulfur trioxide, sulfuric acid and mixtures thereof in order to produce the sulfur-containing gas at a predetermined concentration. Various apparatuses may be used for the generator, although the preferred gas generator system is a sulfur trioxide generator which utilizes molten sulfur pumped from a storage tank into a refractory-lined vessel. There, the sulfur will burn in the ambient air conditions to form a gaseous sulfur dioxide/air mixture. This mixture may then flow into a multi-stage catalytic converter where conversion of the sulfur dioxide to sulfur trioxide is extremely efficient. The catalytic converter is preferably made of vanadium, although other suitable catalytic materials are contemplated by the present invention.

One such on-site generator is produced and sold by Chemithon Corporation of Seattle, Wash., as a flue gas conditioning system. Chemithon makes a number of different gas generator systems, each utilizing a different chemical feedstock. Such a system is also contemplated including a liquid sulfur dioxide system which may be utilized where liquid sulfur dioxide is vaporized in a heated tank and mixed with heated air to form a gaseous sulfur dioxide/air mixture. Like the sulfur burning system described above, this mixture also flows into a multi-stage catalytic converter where the sulfur dioxide catalytically oxidizes to sulfur trioxide. In addition, another embodiment may be utilized which includes a sulfuric acid system suitable for smaller applications in which a liquid sulfuric acid is pumped into a vaporizer and mixed with heated air to form the sulfur-containing gas.

In all the embodiments it is advantageous to include a source of dry air for mixing dry air with the sulfur-containing gas to form a sulfonating gas. The preferred concentration of sulfur in the sulfur-containing gas is a level of between about 1% to about 20% by volume, and needs to be adjusted depending upon the application, the balance being dry air. Optionally, a sulfur trioxide sensor may be placed in line with the gas generator, such that when the sensor determines that the concentration of sulfur-containing gas is too low in the exhausted gas, it can trigger the gas generator to produce more sulfur-containing gas to rejuvenate the sulfonating gas to an optimum concentration level prior to delivering the gas to the site of the sulfonation treatment, whether it is into enclosed vessels such as gasoline tanks or to an enclosed container for holding parts to be sulfonated.

It is most advantageous to also provide a means for exhausting the sulfonating gas from either the enclosed container or the enclosed vessel. The exhaust means has, preferably, a gas delivery and removal system for recycling and reusing the sulfonating gas which has just been exhausted after the sulfonation treatment. The exhaust system may be interconnected with the gas generator so that the exhausting sulfonating gas can be returned to the gas generator to rejuvenate the level of sulfur-containing gas to an optimum sulfonating level for the next job. Then, the rejuvenated sulfonating gas will exit the gas generator and will meet with a source of dry air, preferably heated, to form a hot sulfonating gas mixture which is then ready to be injected into either the next enclosed container having articles therein, or the next enclosed vessel to be sulfonated, such as an automotive gas tank. An optional feature of the apparatuses disclosed in accordance with the present invention would be an in-line heater to heat the dry air for the production of hot, dry air to be combined with the sulfur-containing gas.

In the practice of the present invention, as discussed above, there are apparatuses, methods and articles made by those apparatuses and methods contemplated by the present invention. The basic process of sulfonating generally imparts a barrier layer onto, or incorporated into, a polymeric article which is made of a sulfonatable material. Generally, plastics made of a relatively high molecular weight thermoplastic resin are sulfonatable such that a permeation layer is formed which will substantially prevent any hydrocarbon polymer contained or coming in contact with the polymer from allowing hydrocarbons to pass therethrough. The sulfonation provides impermeability to various oleophilic materials, as described above. Mostly, the oleophilic materials are gasoline and other solvents.

In order to better understand the present invention, it is helpful for one to understand the surface sulfonation of a polymeric article or vessel. Sulfonation is achieved by merely contacting the polymeric surface with the sulfonating gas. The reaction occurs substantially instantaneously when the sulfur-containing gas has a concentration of sulfur from about 1% to about 20% by volume. The more preferred concentration is from 3% to 12% volume percent, and most preferably about 9% by volume. Sulfonating also provides other properties, including antistatic properties, and greater adhesion of paints and other types of coatings. Therefore, such surface sulfonated polymeric materials may also be used as substrates for painting and coating. Some other uses contemplated by the present invention include sulfonating containers such as articles like food containers including plastic bottles, cartons, tubs and the like, and plastic substrates to be used in a number of industrial applications which need to be painted and/or coated thereafter. Consequently, the number of uses for a sulfonated surface are many fold, and are not just restricted to creating a barrier layer on a gasoline tank. However, most of our discussion will be restricted to that usage, with the proviso that such sulfonated articles may be useful in many other applications.

Having said that, to understand the underlying chemical mechanism, it is important to know that during sulfonation, hydrogen atoms which are bonded to the carbon atoms in the hydrocarbons are replaced by sulfonic acid groups, where they become bonded and form a barrier layer. The bonds of the new barrier layer material are stronger and therefore are less likely to allow permeation of hydrocarbons therethrough. However, this advantage may only be realized by using polymeric materials which are sulfonatable in the first place. Suitable polymeric materials include among others thermoset plastics, including polyurethanes, epoxy resins, phenol formaldehyde resins, urea-formaldehyde resins, homopolymers and co-polymers, and blends thereof which are made from organic polymers well known in the art. In addition, thermoplastic condensation-type polymers such as nylon, polyamides and polyesters, may also be sulfonatable.

For example, a gaseous phase reactant mixture containing from about 1 percent to about 20 volume percent of sulfur trioxide, balance volume percent of dry air will require from approximately one (1) second to two (2) minutes to sulfonate a polyethylene automotive gasoline tank to a degree of from about 0.1 to about 5,000 micrograms $SO_3/in^2$, at room temperature (25° C.). If the optional in-line heater is used to heat the dry air, the higher temperature will cause a reduced treatment time to achieve the same degree of sulfonation. It is advantageous to employ a reaction temperature in the range from about 15° C. to about 70° C., and preferably from about 15° C. to about 40° C. The reaction is most advantageously carried out at a pressure from about 0.1 to about 5 PSI, although the reaction may be carried out at atmospheric pressure.

Generally speaking, it is more advantageous to minimize the water vapor partial pressure of the reactant gas mixture which may affect the uniformity of the sulfonation later. The removal of water from the air supply may be accomplished by any conventional means such as vapor tubes or the like. The concentration of water in the dry air should be maintained at a level less than about 0.01 volume percent, based on the resulting volume of the gaseous mixture of reactants overall, and preferably is less than about 0.001 volume percent.

Also common to all aspects of the present invention is the optional step of neutralizing the sulfonated surface after the sulfonation reaction in accordance with the present invention. In the various apparatuses of the present invention, it is contemplated that the means for neutralizing the sulfonated treated surface will include a source of a neutralizing agent selected from the group consisting of ammonia, calcium, aluminum and any positively charged ion-containing fluid and solutions and mixtures thereof. It is also advantageous to provide a means for removing the neutralizing agent after it has neutralized the sulfonated article. The neutralizing apparatus may be a separate apparatus from the sulfonating apparatus, and may utilize liquid or a gaseous neutralizing agent. In the event of an enclosable container having sulfonated articles therein, the sulfonated articles may be individually removed and placed into a liquid neutralizing agent tank, allowed to neutralize, and then removed for further processing. On the other hand, in the event of an enclosed vessel being sulfonated from the inside, such as a gasoline tank, it is advantageous to introduce a neutralizing agent into the enclosed vessel, contact the agent with all of the sulfonated surface, and then allow the neutralizing agent to drain out of the enclosed vessel. The neutralizing agent may be reused and recycled until it is no longer capable of neutralizing.

Now that we have discussed the common aspects of most of the apparatuses and methods in accordance with the present invention, we will individually address each of the six aspects disclosed herein. They will follow in the same order as described first hereinabove.

I. Multi-Port Sulfonation Apparatus to Treat Multiple Articles

Needless to say, it is most advantageous to sulfonate numerous articles in a production mode, while allowing for recycling of the sulfonating gas so as not to allow it to escape into the atmosphere or come in contact with workers at the facility where the sulfonation is taking place. An apparatus in accordance with this embodiment of the present invention for applying a sulfonating treatment or surface modification onto the surface of polymeric articles includes an on-site gas generator with a multi-port gas delivery system having individual ports or inlets for connecting to a group of individual polymeric articles, including plastic gas tanks, plastic gas receptacles, hydrocarbon storage systems, and the like.

Further included is a plurality of means for introducing a sulfonating gas onto the surface of the individual polymeric articles. The means for introducing a sulfonating gas may include a spring tensioned pump inlet as will be described in more detail further hereinbelow. The sulfonating gas which will be utilized is comprised of dry air and a sulfur-containing gas made by the on-site gas generator. Although dry air works at room temperature, it is especially useful at an elevated temperature of between about 15° C. and 70° C. The sulfur-containing gas shall include a mole percentage of elemental sulfur within the sulfur-containing gas of from about 1 percent to about 20 percent. The elemental sulfur which is utilized may be sourced from a chemical feedstock selected from the group consisting of raw sulfur, processed sulfur, sulfur dioxide, liquid sulfur dioxide, sulfuric acid, sulfur trioxide and mixtures thereof. Various gas generating procedures will use various precursors, depending upon the equipment utilized and the desired end result. Needless to say, some of the sulfur in the sulfur-containing gas is consumed during the treatment to form the sulfonation treatment layer on the surface of the polymeric article.

The multi-port delivery system may also include a manifold means for containing and transporting the sulfonating gas between the multiple ports of the gas delivery system so that the unused sulfonating gas can be recycled and delivered to yet more polymeric articles so that more of the elemental sulfur may be consumed to form a sulfonation treatment layer on more of the articles. In addition, the apparatus may include a means for introducing a neutralizing agent onto the surface of the polymeric articles. This may be a separate operation or a machine, or may be incorporated directly into the apparatus, as is also envisioned by the present invention. The neutralizing agent which is selected is preferably selected from the group consisting of ammonia, calcium, aluminum, and any positively charged ion-containing fluid and mixtures and solutions thereof. The neutralizing agent introduction means may be as simple as a hose inserted into a vessel or a container holding the sulfonated articles, in which the liquid neutralizing agent can be poured onto the sulfonated surface in order to neutralize it. Thereafter, the agent may be drained out, and rinsed if desired.

In order to achieve the recycling feature, it is preferable to have our gas generator on-site for instantaneous production of the sulfur-containing gas from a sulfur-containing compound feedstock in order to replenish the sulfur mole percentage concentration in the spent sulfur-containing gas back to a level of between about 1 percent to about 20 percent. Again, the sulfur-containing gas is preferably sulfur trioxide, which is made on-site from a sulfur-containing compound feedstock selected from the group consisting of raw sulfur, processed sulfur, sulfur dioxide, liquid sulfur dioxide, sulfuric acid, sulfur trioxide and mixtures thereof. For the greatest production capability, the gas generator is preferably a vanadium catalytic converter which can catalytically burn liquid sulfur dioxide to yield sulfur trioxide gas.

The multi-port gas delivery system described above may further comprise a means for exhausting the sulfonating gas from the interior of the enclosed vessel. This exhaust means may be included as part of the inlet which may include a substantially airtight injection nozzle, or may be a separate exhaust hose coming from and through the injection nozzle. The injection nozzle may also be used as the exhaust system. Once the gas is exhausted through the airtight injection nozzle, it can be passed via tubes and the gas delivery system back to a central location which can be pumped back through the gas generator in order to be rejuvenated to be used for the next round of polymeric articles to be sulfonated. Especially useful is an in-line sensor monitor for detecting the sulfur concentration in the sulfur-containing gas to enable replenishing of the sulfur content of the sulfonating gas to bring it back to full strength, such a sensor monitor is readily available in conventional streams of commerce. In accordance with data collected from the in-line sensor monitor, data transmission may be made to the sulfur-containing gas generator, and the gas generator can replenish the gas before it is injected into the next series of polymeric articles.

Looking now to FIG. 1, a sulfonation apparatus is generally denoted by the numeral 10, and includes injection nozzles 12 having an airtight seal 14. Injection nozzles 12 are in gaseous communication with gas manifold 16 through the gas carrier tubes 18. An additional set of gas carrier tubes 18 may be used for exhausting gas from the enclosed vessels once the sulfonation has taken place. The sulfonation apparatus 10 may further include motorized vertical slide supports 20 for raising and lowering the entire assembly of injection nozzles and gas manifold components.

Enclosed vessels 22 are held in place on vessel positioning tray 24 and are positioned so as to be able to receive one injection nozzle for each enclosed vessel. Once the gas manifold assembly is lowered on the motorized vertical slide support, injection nozzle 12 is deeply seated within the interior space of vessel 22 and the seal is rendered airtight by airtight seal 14. Pump 32 is utilized to pump sulfur-containing gas from the sulfur-containing gas generator 28 to injection nozzles 12. Chemical feedstock source 26 is used for the raw materials to be run through gas generator 28 and may have an optional sulfur concentration monitor 30 in-line between gas generator 28 and pump 32. If gas is being exhausted and recycled through recycling tube 34, the gas generator can replenish the sulfur-containing gas to its optimum level before injecting into a new set of enclosable vessels.

Looking next to FIGS. 2 and 3, like numbers are used for identical elements. FIG. 2 is a perspective detailed view of the injection nozzle generally denoted by numeral 40, showing the injection nozzle 42 itself next to airtight seal 44. Inlet tube 46 delivers fresh sulfur-containing gas, preferably sulfur trioxide, while outlet 48 may be utilized for exhausting the spent gas. A lower platen 50 is spring loaded by spring 52 to upper platen 54. By utilizing a telescoping stanchion system 56, injection nozzle 40 can be pressurized and placed into the appropriate position for injecting sulfonating gas 58 into enclosed vessel 60. FIG. 3 illustrates these elements with the airtight seal 44 pressed tight against the upper rim of enclosed vessel 60. Once upper platen 54 has been thrust downwardly to its desired position, the sulfonating gas 58 may be injected into an enclosed vessel 60, preferably a gasoline tank, although it may be any other type of vessel which requires the barrier layer to be placed on the interior surface.

II. Sulfonation Apparatus to Treat an Interior Surface of a Vessel

Needless to say, this method and apparatus can be utilized for single enclosed vessels, although it would be most advantageous to be placed in a production mode of multiple vessels being sulfonated at the same time. A similar apparatus to that shown in FIGS. 1–3 may be utilized, although any injection nozzle which can form an airtight seal against the neck or filler portion of an enclosable vessel may be utilized. Although the preferred embodiment is discussed in detail hereinabove, the present invention also envisions a single injection nozzle with a flat airtight seal, such as the airtight seal 44 of FIG. 2, which can be used to seal off the enclosable vessel and make it airtight so that the sulfonating gas, preferably sulfur trioxide, will not escape during the inlet phase of the operation.

Like the multi-port delivery system, a singular system can also utilize a gas inlet port and an outlet exhaust means. Such a system would include at least one inlet to be inserted into the enclosed vehicle for injecting the sulfonating gas into the vessel. As described above, the inlet would include a means for effecting a substantially airtight seal before the gas is injected into the vessel. Preferably, a gas manifold having at least one gas carrier is connected to the inlet at one end, and also connected to an on-site and on-demand sulfur-containing sulfonating gas generator at the other end. As described above, it is preferred if the gas generator uses a chemical feedstock selected from the group consisting of raw sulfur, processed sulfur, sulfur dioxide, liquid sulfur dioxide, sulfuric acid, sulfur trioxide, or mixtures thereof, to produce the sulfur-containing gas. The system works best with a source of dry air for mixing with the sulfur-containing gas to form a sulfonating gas with the proper concentration of sulfur. Most preferably, the source of dry air may also have an in-line heater for heating the air to a temperature of from about 15° C. to about 70° C.

A pump is used to pump the sulfonating gas from the generator into the injection inlet placed inside the enclosed vessel, so that the sulfonating gas is pumped into the interior surface of the enclosed vessel, where the surface is treated by consuming some of the sulfur in the sulfonating gas to form a treated layer. As with the multi-port delivery system described hereinabove, this single unit system may also have an exhaust system to remove the sulfonating gas from within the enclosed vessel, which may thereafter be recycled through the gas generator to replenish the sulfur content of the gas after it has been consumed. In order to neutralize the interior surface of the vessel, any means for introducing a neutralizing agent into the interior of the vessel may be utilized, including merely pouring in a liquid neutralizing agent and thereafter draining it out of the vessel, or any other feasible method. The neutralizing agent may be selected from the group consisting of ammonia, calcium, aluminum or any other positively charged ion-containing fluid and solutions and mixtures thereof.

Again, the preferred gas generator includes a vanadium catalytic converter for the on-site production of sulfur-containing gas from a sulfur trioxide compound. An in-line sensor may optionally be included for monitoring the concentration of sulfur in the sulfur-containing gas as it is exhausted, whereby information from the sensor can be utilized to replenish and maintain a concentration of sulfur to a level of between about 1 percent to about 20 percent by mole percentage of the sulfonating gas. This means that the gas is recycled and replenished on site in order to achieve optimum values. Of course, this apparatus is most advantageous when polymeric material vessels are utilized, as they are especially sulfonatable, such as a plastic automotive gasoline tank or its other components, including caps, filler necks, rollover valves and/or any other plastic components utilized in connection with the gasoline tank.

III. Sulfonation Apparatus to Treat Articles Within an Enclosable Container

For sulfonating other automotive gasoline tank components, such as the caps, filler necks, valves, etc., disclosed hereinabove, it may be more advantageous to place such articles into an enclosable container which is airtight, such that the articles may be enclosed in the container, sealed to an airtight condition, and then having the similar configuration for the gas generator, air heater, sensor and/or monitor, and gas generator as with the multi-port or single vessel apparatus described above.

Figure 4:
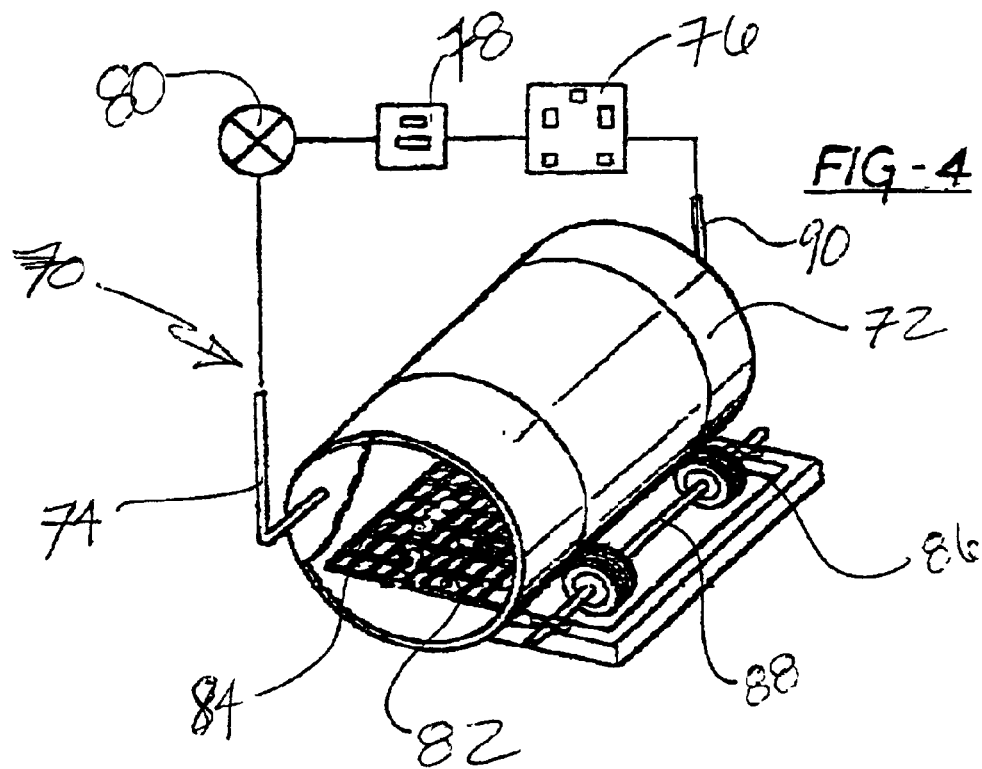
FIG. 4 is an enclosed container for holding smaller parts to be sulfonated.

Referring now to FIG. 4, there is an enclosable container sulfonation apparatus generally denoted by numeral 70, which includes an enclosable container 72 having a gas inlet 74 injecting gas into the interior of the container. Gas generator 76 distributes gas into the enclosed container 72 through pump 80 and gas inlet 74. After the articles contained therein have been sulfonated, the sulfonating gas is exhausted either by pump 80 through gas inlet 74 or through a separate gas outlet 90 which brings the gas back to the gas generator 76 for replenishing the sulfur content to its optimum value. As with the multi-port system, a sulfur concentration monitor 78 may be put in line with the gas generator, such that the sulfur monitor will yield the information needed for the amount of gas to be generated by the gas generator.

Referring again to FIG. 4, there is shown a drum batch roller with a rack 82 contained therein. Articles 84 shown on the rack may be subjected to a rolling action via rollers 86 attached to roller mount 88. In this embodiment, articles 84 are placed and attached to the rack, while the drum is rolled and the sulfonating gas is put into the airtight vessel 72. After the sulfonation, the gas is exhausted and the parts may be removed from the drum roller.

Figure 5:
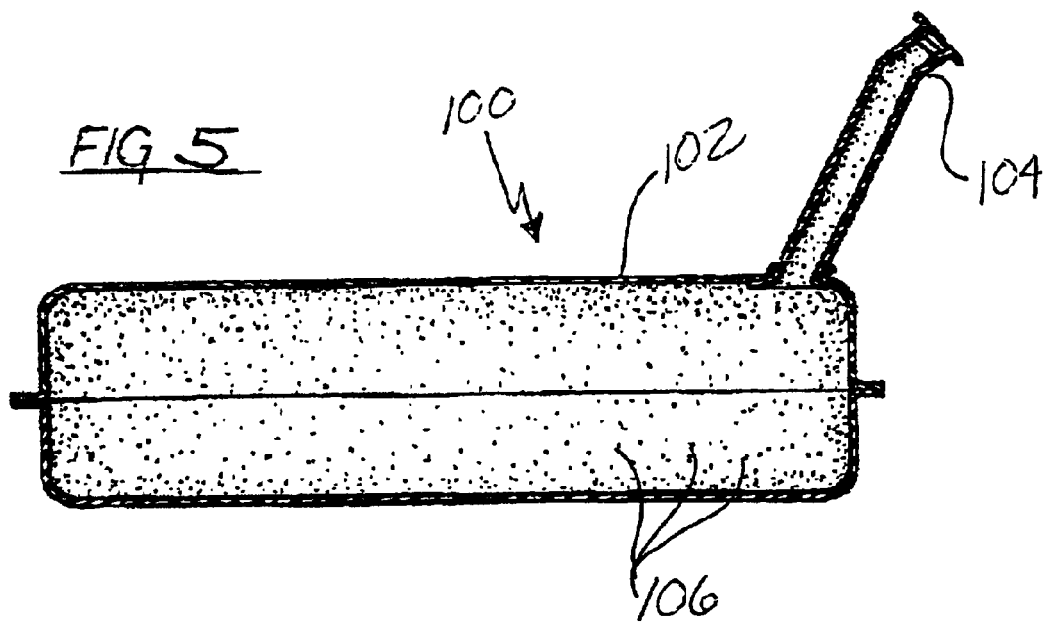
FIG. 5 is a cross-section of an automotive gasoline tank after sulfonation.

FIG. 5 illustrates a cross-section of a standard gasoline tank which has been sulfonated and is generally denoted by the numeral 100. The gas tank 102 is made of a plastic material, as is conventional in the industry. After sulfonating through a method of sulfonating an enclosed vessel, the filler neck 104 receives the injection inlet. Thereafter, sulfonation gas is urged into the interior cavity of the gasoline tank 102 leaving a sulfonated surface 106. On most plastic vessels, the interior turns a charcoal black color after sulfonation, which just takes a matter of seconds.

IV. Method of Sulfonating an Article in an Enclosable Container

After considering the apparatuses described hereinabove, it is also an embodiment of the present invention to provide a method of sulfonating an article to effect a surface treatment, including the steps of placing at least one article in an enclosable container and sealing the at least one article into the container in a substantially airtight fashion. Thereafter, a sulfur-containing gas is generated on site by a gas generator utilizing a chemical feedstock selected from the group consisting of raw sulfur, processed sulfur, sulfur dioxide, liquid sulfur dioxide, sulfuric acid, sulfur trioxide, and mixtures thereof. Dry air is also provided from a source of dry air to be mixed with the sulfur-containing gas to form a sulfonating gas. Then, the resultant sulfonating gas is pumped into the enclosable container until the surface treatment is effected. The resulting sulfonated article will have consumed some of the sulfur in the sulfur-containing gas to form the treatment layer. Preferably, in this method, there is a step of exhausting the sulfonating gas from the enclosed vessel after the sulfonation. Then, the treated surface may be neutralized with a neutralizing agent selected from the group consisting of ammonia, calcium, aluminum and any positively charged ion carried by a fluid and mixtures and solutions thereof. This will yield a neutralized, sulfonation treatment layer on the surface of the at least one article.

In order for the optimum reaction, it is preferable to heat the dry air before mixing with the sulfur-containing gas. In this method, the sulfur-containing gas may be recycled and reused by monitoring the concentration of the sulfur compound within the sulfur-containing gas after exhausting, and replenishing the sulfur concentration of the exhaust gas back up to a level of between about 1 percent and about 20 percent by mole percentage from the on-site and on-demand gas generator. This way, the resultant replenished sulfur-containing gas may be recycled and reused. Most preferably, the step of monitoring the concentration of the sulfur compound is accomplished after the gas has been exhausted from the enclosed container, and that monitor will trigger a quantity of sulfur-containing gas which will be generated from the on-site generator to replenish the sulfonating gas which has been recycled from a previous sulfonating treatment, mixing the recycled gas with heated dry air to form a replenished sulfonating gas and thereafter recycling the replenished mixture back into a new enclosed container to perform a subsequent sulfonation treatment. As described above, the preferred method includes a step of on-site generating of a sulfur-containing gas by a sulfur-conditioning system available from Chemithon Corporation of Seattle, Wash. Chemithon Corporation provides vanadium catalytic gas generator systems which oxidize sulfur dioxide into sulfur trioxide, or from raw sulfur through a multi-stage process into sulfur trioxide. The on-site generating of the sulfur-containing gas may include a two-step process of first burning elemental sulfur to form sulfur dioxide, followed by oxidizing the sulfur trioxide into sulfur trioxide, and then utilizing the sulfur trioxide as the sulfonating gas to effect the treatment of any surface of an article. The on-site generating of the sulfur-containing gas may also be accomplished by pumping liquid sulfuric acid into a vaporizer and then mixing with air. Depending on which model of gas generator you purchase, you may start with the relatively inexpensive raw sulfur or, as a precursor, you may first utilize sulfur dioxide which is a more expensive raw material. Either way, the sulfur trioxide gas is the most preferable resultant sulfonating gas, although other sulfonating materials are effective and may be utilized.

V. Method of Sulfonating an Interior Surface of a Vessel

We now come to yet another embodiment of the present invention, which includes a method of sulfonating an enclosed vessel to sulfonate the interior of the vessel. Sulfur-containing gas is generated and/or replenished on site from a chemical feedstock as described above. Dry air is provided from a source of dry air and mixed with the sulfur-containing gas to form a sulfonating gas. Again, it is best if the dry air is heated to a temperature of between 15° C. and 70° C. and thereafter mixed with the sulfur-containing gas to effect the best treatment. The sulfonating gas is then injected into the enclosed vessel until the surface treatment is effected, generally detectable by the look of a charcoal black appearance. The resulting treated article has obviously consumed some of the sulfur from the sulfur-containing gas to form a sulfonated layer, which may be visually noted. As with the steps enumerated above for sulfonated articles in an enclosed container, the enclosed vessel is just utilized as the container, and the sulfonated article is treated on the inside, rather than on its outside surfaces. Needless to say, the enclosed vessel may include such articles as gasoline tanks, solvent storage containers, and the like. Therefore, after treating the article, it is most preferable to exhaust the sulfonating gas after the sulfonation has taken effect, and to maintain the gas in an enclosed gas delivery system so that none of the sulfonating gas is escaped into the atmosphere. Upon exhausting the gas from the enclosed vessel, the sulfur concentration may be monitored and that information can be forwarded to the gas generator, where the gas generator is electronically directed to produce a certain amount of sulfur-containing gas in order to maintain the sulfur concentration to a level of between about 1 percent and about 20 percent by volume. This allows the resultant replenished sulfur-containing gas to be recycled and reused, without being released into the atmosphere. Again, the recipe for the sulfur-containing gas is the same as described hereinabove with regard to other embodiments. These sulfur-containing gases are extreme irritants to the respiratory system of any worker, and should not be exhausted into the atmosphere.

Also in this method, there generally is most preferably a step of neutralizing the treated vessel by injecting a neutralizing agent into the vessel, filling it, swirling it around or turning it upside down, and then draining out the neutralizing agent, if the neutralizing agent is a liquid. Usually, the neutralizing agent is selected from the group consisting of ammonia, calcium, aluminum and any positively charged ion-containing fluid and mixtures and solutions thereof.

Especially useful in this method is the step in the present invention of generating sulfur trioxide from elemental sulfur on-site and on-demand for sulfonation. However, this particular step is accomplished by a relatively expensive piece of equipment. If the operation of the method of the present invention is a relatively small one, it may be more advantageous to purchase a less expensive gas generator which catalytically oxidizes sulfur dioxide into sulfur trioxide. And if the economics are very low, the least expensive system may be purchased which pumps liquid sulfuric acid into a vaporizer and mixes with air to form sulfur trioxide gas. The method is best practiced on polymeric materials, described above, as they are sulfonatable. Especially useful, as always, is the automotive plastic gasoline tank.

VI. Sulfonated Articles Made by the Above Methods

Yet the final embodiment of the present invention includes articles made by the methods and apparatuses as described hereinabove. The automotive plastic gasoline tank is especially desirable because the barrier layer which is created by the sulfonation is complete, and is especially good for stopping the permeation of liquid gasoline through a plastic gasoline tank and escaping into the atmosphere. Other articles which are of great advantage include solvent containers for environmentally hazardous hydrocarbons such as benzene, toluene, methylene, and the like.

It has also been found that adhesion is greatly enhanced by the sulfonation of a surface. So, the above-described apparatuses and methods may be utilized for sulfonating any type of article, whether the end result is a formation of a barrier layer, an adhesion layer, a coating or surface treatment, or any other purpose. Articles contemplated by the present invention not only include automotive parts and storage containers, but consumer goods which require good adhesion properties for coatings, industrial applications including recycled materials that will have better adhesion properties after sulfonating for reconstituting the materials, and any other article for which its exterior or interior surface is advantageously sulfonated. It may be useful for an article to be sulfonated for any host of reasons beyond its use as a barrier layer, including (but not limited to) better coating adhesion, as a precursor for crosslinked materials applied thereafter, or any other known use.

Therefore, there has been described, in accordance with the present invention, apparatuses, methods and articles made by those apparatuses and methods which meet all of the objects and advantages as described above. While the invention has been described in detail with regards to the best mode and specific embodiments, one of ordinary skill in the art will realize certain modifications and alterations which also fall within the scope of this patent. Therefore, the invention may not be limited by the above examples and descriptions, and is only limited by the appended claims.

What is claimed is:

1. An apparatus for sulfonating the surface of an article with a sulfonating gas to modify and treat the surface, comprising:
   an enclosable container for receiving the article therein, said container being capable of being substantially air tight to contain substantially all the sulfonating gas;
   a gas inlet for introducing the sulfonating gas into the enclosable container;
   an on-site and on-demand catalytically oxidizing gas generator in communication with the enclosable container through the gas inlet, said ass generator including a catalytic converter to oxidatively generate a sulfur-containing gas from a chemical feed stock selected from the group consisting of raw sulfur, processed sulfur, sulfur dioxide, liquid sulfur dioxide, sulfuric acid and mixtures thereof to produce the sulfur-containing gas at a predetermined concentration;
   a source of dry air for mixing with the sulfur-containing gas to form the sulfonating gas;
   a means for exhausting the sulfonating gas from the enclosed container after the treatment has been effected;
   a means for neutralizing the sulfonated treated surface, including a source of a neutralizing agent selected from the group consisting of ammonia, calcium, aluminum and any positively charged ion-containing fluid and solutions and mixtures thereof, and a means for removing the neutralizing agent after it has neutralized the sulfonated article; and
   a pump for pumping the sulfonating gas into the enclosable container,
   whereby some of the sulfur in the sulfonating gas is consumed to form the treatment layer on the surface of the article.

2. The apparatus of claim 1, wherein the sulfonating gas includes sulfur trioxide and dry air.

3. The apparatus of claim 1, further comprising an in-line heater to heat the dry air for the production of hot, dry air to be combined with the sulfur-containing gas made by the gas generator to form a hot sulfonating gas mixture.

4. The apparatus of claim 1, further comprising a gas carrier from the exhaust means to the gas inlet so that the exhaust sulfonating gas may be recycled and re-used.

5. The apparatus of claim 4, wherein the recycling gas carrier is in line with the gas generator so that the sulfur content of the sulfonating gas may be rejuvenated to a concentration of a level from about 1% to about 20% by volume of the sulfonating gas.

6. The apparatus of claim 1, wherein said gas generator includes a vanadium catalytic converter for the on-site production of sulfur-containing gas from a sulfur-containing compound selected from the group consisting of raw sulfur, processed sulfur, sulfur dioxide, liquid sulfur dioxide, sulfuric acid and mixtures thereof.

7. An apparatus for sulfonating an enclosed vessel with a sulfonating gas to modify and effect a treatment on the interior surface of the vessel, comprising:
   at least one inlet to be inserted into the enclosed vessel for injecting sulfonating gas into the vessel, said inlet including a means for effecting a substantially airtight seal before the gas is injected into the vessel;
   a gas manifold having at least one gas carrier connected to the at least one inlet;
   an on-site and on-demand catalytically oxidizing gas generator in communication with the enclosable container through the gas inlet, said gas generator including a catalytic converter to oxidatively generate a sulfur-containing gas from a chemical feed stock selected from the group consisting of raw sulfur, processed sulfur, sulfur dioxide, liquid sulfur dioxide, sulfuric acid and mixtures thereof to produce the sulfur-containing gas at a predetermined concentration;
   a source of dry air to be mixed with the sulfur-containing gas to form the sulfonating gas;
   a means for exhausting the sulfonating gas from within the enclosed vessel;
   a means for neutralizing the treated interior surface of the vessel, including a means for introducing a neutralizing agent into the interior of the vessel, said neutralizing agent being selected from the group consisting of ammonia, calcium, aluminum, and any positively charged ion-containing fluid and solutions and mixtures thereof, such that the enclosed vessel has been neutralized; and
   a pump for pumping the sulfonating gas through the injection inlets into the enclosed vessel,
   whereby the interior surface of the enclosed vessel has a treatment imparted thereon by consuming some of the sulfur in the sulfonating gas to form a treated layer.

8. The apparatus of claim 7, wherein said gas generator includes a vanadium catalytic converter for the on-site production of sulfur-containing gas from a sulfur-containing compound selected from the group consisting of raw sulfur, processed sulfur, sulfur dioxide, liquid sulfur dioxide, sulfuric acid and mixtures thereof.

9. The apparatus of claim 7, wherein the vessel includes vessels made of a polymeric material.

10. The apparatus of claim 7, wherein the vessel includes a plastic automotive gasoline tank.

11. The apparatus of claim 7, wherein the at least one inlet includes an injection nozzle adapted for mating with the enclosure of the enclosed vessel to effect an airtight seal.

12. An apparatus for applying a sulfonating treatment or surface modification onto the surface of polymeric articles, comprising:

a catalytic converter gas generator for the on-site production of a sulfur-containing gas from a sulfur-containing compound feedstock selected from the group consisting of raw sulfur, processed sulfur, sulfur dioxide, liquid sulfur dioxide, sulfuric acid and mixtures thereof, said on-site production of the sulfur-containing gas also being adapted to replenish the sulfur mole percentage concentration in the spent sulfur-containing gas to a level of between about 1% to about 20%, based upon the volume of the sulfur-containing gas being generated;

a multi-port sulfonating gas delivery system having individual ports for connecting to a plurality of individual polymeric articles for introducing a sulfonating gas onto the surface of individual polymeric articles such that a treatment layer is formed on the surface of the article, said sulfonating gas being comprised of dry air and the sulfur-containing gas, said dry air being at an elevated temperature of between about 15° C. and 70° C., whereby some of the sulfur in the sulfur-containing gas is consumed to form the treatment layer;

a manifold means for containing and transporting the sulfonating gas between the multiple ports of the gas delivery system so that the unused sulfonating gas can be recycled and delivered to additional polymeric articles for more of the elemental sulfur to be consumed by forming a the treatment layer on more of the articles;

a pump for supplying the sulfonating gas to the gas delivery system and exhausting the sulfonating gas via the manifold;

a means for introducing a neutralizing agent onto the surface of the polymeric articles, said neutralizing agent being selected from the group consisting of ammonia, calcium, aluminum and any positively charged ion-containing fluid and mixtures and solutions thereof; and whereby an effective concentration of sulfur-containing compound is present in the sulfonating gas and may be reused and recycled for sulfonating additional articles.

13. The apparatus of claim 12, wherein the catalytic converter is made of vanadium.

14. The apparatus of claim 12, further comprising at least one inlet for insertion into a polymeric article, said at least one inlet including substantially airtight injection nozzles.

\* \* \* \* \*